April 15, 1930.  T. H. THOMAS  1,754,246
ELECTROPNEUMATIC BRAKE
Filed Aug. 31, 1928
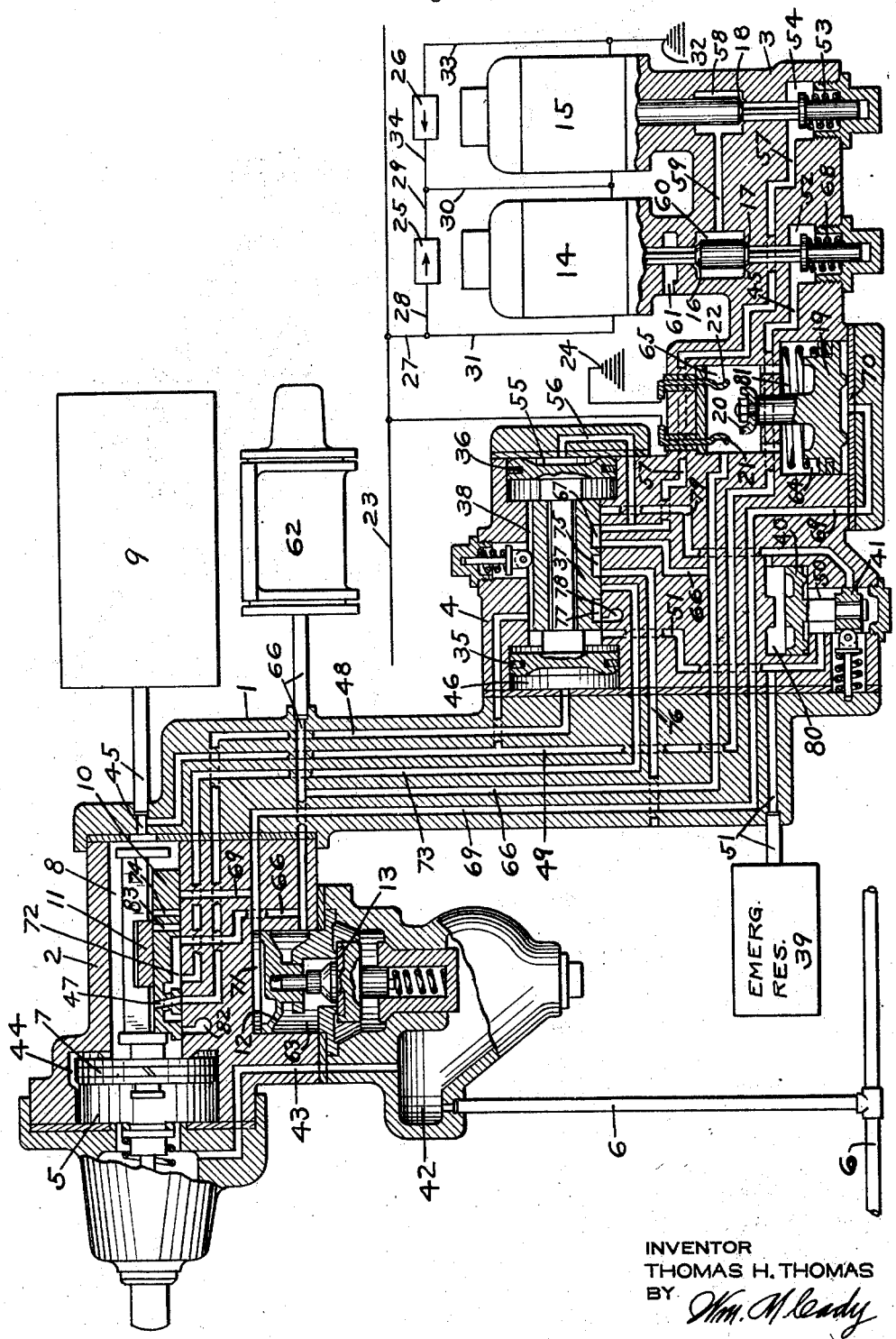
INVENTOR
THOMAS H. THOMAS
BY
*Wm. N. Cady*
ATTORNEY Patented Apr. 15, 1930

1,754,246

UNITED STATES PATENT OFFICE

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

ELECTROPNEUMATIC BRAKE

Application filed August 31, 1928. Serial No. 303,254.

This invention relates to electro-pneumatic brakes, and has for its principal object the provision of an improved electro-pneumatic brake equipment which may be controlled either electrically or pneumatically and which when controlled pneumatically will operate in harmony with fluid pressure brake equipment which does not embody my invention.

Another object of my invention is to provide an electro-pneumatic brake equipment in which an electric current failure, a ruptured air hose, or the like will cause an application of the brakes to be effected.

A further object of my invention is to provide an electro-pneumatic brake equipment which may be controlled either electrically or pneumatically with means whereby the auxiliary reservoir and emergency reservoir are connected together when the brake is controlled electrically and whereby the emergency reservoir is vented to the atmosphere when the brake is controlled pneumatically.

Other objects and advantages will appear in the following more detailed description.

In the accompanying drawing, the single figure is a diagrammatic view, mainly in section, of an electro-pneumatic brake equipment embodying my invention.

As shown in the drawing, the electro-pneumatic brake equipment may comprise a bracket section 1 to which is applied a triple valve portion 2, an electric portion 3 and a change-over portion 4.

The triple valve portion 2 may comprise a casing having a piston chamber 5 connected to the brake pipe 6 and containing a piston 7 and having a valve chamber 8 connected to an auxiliary reservoir 9 and containing the usual main slide valve 10 and graduating valve 11 adapted to be operated by the piston 7.

The quick action portion of the triple valve portion may comprise the usual piston 12 for operating a train pipe vent valve 13.

The electro-pneumatic portion 3 comprises electro-magnets 14 and 15, the magnet 14 controlling the operation of double beat valves 16 and 17 and the magnet 15 controlling the operation of a valve 18. Associated with the electro-pneumatic portion is an electric switch device having a piston 19 for operating a switch contact 20 adapted when closed to connect contact terminals 21 and 22 which are connected to a train wire 23 and ground 24 respectively.

Associated with the magnets 14 and 15 are rectifiers 25 and 26 which are disposed in shunt circuits around the magnets, and are adapted to permit the flow of electric current only in one direction, as indicated by the arrow on each rectifier. The resistance of each shunt circuit, including the rectifier, is so small in comparison to the resistance of the magnet around which said shunt circuit is made, that substantially all the current flows through the rectifier, and the small amount of current that flows through the magnet is insufficient to operate said magnet. For example the current flowing from wire 23 and through wires 27 and 28 flows through the rectifier 25 and is prevented from flowing through the shunt circuit around the magnet 15 by the rectifier 26. The current therefore flows through wires 29 and 30, and magnet 15 energizing said magnet. The small amount of current that flows through a wire 31 and magnet 14, in this instance, is insufficient to operate this magnet. In the same manner, when current is flowing in the reverse direction, from ground 32 through wire 33, rectifier 26, wires 34 and 30, magnet 14 and wires 31 and 27 to the train wire 23, thus energizing the magnet 14 while the magnet 15 remains substantially deenergized.

The change-over portion 4 comprises connected pistons 35 and 36 which are adapted to operate a slide valve 37 contained in a valve chamber 38.

Associated with the change-over portion 4, is a check valve device which is operative to prevent the charging of an emergency reservoir 39 when the brake is pneumatically controlled, said check valve comprising a piston 40 which is adapted to operate a slide valve 41.

For the purpose of controlling the brakes pneumatically the usual brake valve (not shown) is employed, and to control the brakes electrically any suitable switch device (not shown) may be employed.

In operation, assuming the brake valve device to be in running or release position and the brake switch device in a corresponding position in which an electric current from a battery or other source of current will flow through ground, wire 33, rectifier 26, wires 34 and 30, magnet 14 and is returned to the battery through wires 31 and 27 and the train wire 23, thus energizing the magnet 14. As hereinbefore mentioned, current flowing in this direction will not energize the magnet 15.

With the brake valve device in release position, fluid under pressure flows from the brake pipe 6 into the piston chamber 5 by way of a chamber 42 in the triple valve device and a passage 43. From this chamber 5 fluid under pressure flows to the valve chamber 8 through the usual feed groove 44 and from the valve chamber flows into the auxiliary reservoir 9 by way of a passage and pipe 45.

From the valve chamber 8 fluid under pressure is supplied to a chamber 46 at one side of the change-over piston 35 by way of a port 47 in the main slide valve 10 of the triple valve portion and passage 48.

From the passage 45 fluid under pressure is supplied to the valve chamber 38 of the change-over portion by way of a passage 49 and from this chamber fluid under pressure flows to the emergency reservoir 39 and to a valve chamber 50 containing the check valve 41, by way of passage 51.

Since the magnet 14 is energized, the valve 17 is seated so that fluid under pressure, supplied to a chamber 52 beneath the valve 17, will be prevented from flowing past the valve and will thus be bottled up.

With the valve 17 seated, the valve 16 is unseated, and since the magnet 15 is deenergized, the valve 18 is unseated, due to the pressure of a spring 53 contained in a chamber 54 acting on the stem of the valve, so that the chamber 55 at one side of the piston 36 of the change-over portion is vented to the atmosphere by way of passages 56 and 57, chamber 54, past the unseated valve 18, valve chamber 58, passage 59, valve chamber 60, past the unseated valve 16 and through atmospheric passage 61.

With the piston chamber 55 of the change-over portion thus vented, and the piston chamber 46 and valve chamber 38 supplied with fluid under pressure, pressure of fluid in the chamber 38 acting on one side of the piston 36 causes said piston and piston 35, together with the slide valve 37, to move to or be maintained in their right hand or electric positions. In this position of the slide valve 37, the brake cylinder 62, chamber 63 at one side of the quick action piston 12, chamber 64 at one side of the switch piston 19 and the connected chamber 65 containing the switch contacts 20, 21 and 22 are vented to the atmosphere by way of passage 66, cavity 67 in the slide valve 37, passage 57 and connected chambers and passages to which the passage 57 leads.

With the equipment thus charged with fluid under pressure, an electric service application may be effected by operating the brake switch device to service position. When effecting such an application of the brakes, the brake valve device is maintained in release position.

With the brake switch in service position, the magnets 14 and 15 are deenergized. Upon the deenergization of the magnet 14, the pressure of a spring 68 contained in the chamber 52 will cause the valve 16 to seat and close off communication of the valve chamber 60 with atmosphere through passage 61, and the valve 17 to unseat, and the deenergization of the magnet 15 will cause the valve 18 to unseat. With the valves 17 and 18 thus unseated, the equalized pressure of the auxiliary reservoir 9 and emergency reservoir 39 is supplied to the brake cylinder 62 by way of passage and pipe 45, chamber 52, past the unseated valve 17, valve chamber 60, passage 59, valve chamber 58, past the unseated valve 18, chamber 54, passage 57, cavity 67 in the change-over slide valve 37 and passage and pipe 66. Fluid under pressure from the passage 57 is also supplied to the change-over piston chamber 55 through passage 56, but since the change-over piston chamber 46 and valve chamber 38 are charged with fluid at auxiliary reservoir pressure, the change-over pistons and slide valve will remain in their electric positions as shown in the drawing.

When a full service electric application of the brakes is not desired, brake switch is moved to lap position in which the magnet 15 is energized and the magnet 14 is maintained deenergized. With the magnet 15 energized, the valve 18 is seated, thus closing off the further supply of fluid under pressure to the brake cylinder.

To effect an electric emergency application of the brakes, the brake switch is operated to emergency position in which the magnets 14 and 15 are deenergized so that fluid under pressure is supplied to the brake cylinder in the same manner as described in connection with a service application of the brakes.

To effect the release of the brakes electrically, the brake switch is operated to release position, in which the magnet 14 will be energized and the magnet 15 deenergized. With the magnet 14 energized, the valve 17 is seated, closing off the supply of fluid under pressure to the brake cylinder and the valve 16 is unseated so that fluid under pressure in the brake cylinder will be vented to the atmosphere, by way of pipe and passage 66, cavity 67 in the change-over slide valve 37, passage 57, chamber 54 past the open valve 18, valve chamber 58, passage 59, valve chamber 60, past the open valve 16 and through atmospheric passage 61. The change-over piston chamber 55 is also vented to the atmosphere by way of passage 56 and passage 57.

It will be understood that the brakes are normally controlled electrically, the pneumatic control being operative only in cases where the electric control is rendered inoperative.

If, when the electric control is cut in, a failure in the electric circuits should occur and the failure should be of such a nature as to cause the magnets 14 and 15 to be deenergized, an application of the brakes will be effected in the same manner as hereinbefore described in connection with the electric service application. Should the train wire be grounded, the magnets 14 and 15 will be deenergized and an application of the brakes effected.

In cases where there is a sudden reduction in brake pipe pressure due to the bursting of an air hose or the like, the triple valve piston will move to its emergency position in the usual manner, carrying with it the slide valve 10. With the slide valve thus moved to emergency position, a passage 69, leading to the seat of the triple valve slide valve, is uncovered, so that fluid under pressure is supplied therethrough from the valve chamber 8 to a chamber 70 at one side of the switch piston 19 and is also supplied to the chamber 71 in the triple valve device at one side of the quick action piston 12. Pressure of fluid supplied to the chamber 70 causes the switch piston 19 to move upwardly a sufficient distance that the contact 20 will connect the contact terminals 21 and 22, thus connecting the train wire 23 to ground 24. With the train wire grounded, the magnets 14 and 15 on each car of the train will be deenergized, causing the valve 16 on each car to be seated and the valves 17 and 18 to be unseated.

When the slide valve moves to emergency position, a cavity 72 therein connects the passage 48 leading from the piston chamber 46 in the change-over valve device with a passage 73 leading to the seat of the change-over slide valve 37. Since the passage 73 is at atmospheric pressure only, the pressure of fluid in the piston chamber 46 is reduced.

Further, when the slide valve is in emergency position fluid under pressure is supplied to the brake cylinder 62 through passage 74 in the slide valve 10 and passage and pipe 66.

Since the valves 17 and 18 of the magnet valve devices are unseated, fluid under pressure is also supplied to the brake cylinder 62 from the auxiliary reservoir 9 by way of pipe and passage 45, chamber 52 in one of the magnet valve devices, past the unseated valve 17, through valve chamber 60, passage 59, valve chamber 58, past the unseated valve 18, chamber 54, passage 57, cavity 67 in the change-over slide valve 37 and passage 66.

Fluid under pressure flowing through passage 57 also flows to the piston chamber 55 in the change-over valve device by way of passage 56, and when the pressure of fluid in this chamber is great enough to overcome the pressure of fluid in the piston chamber 46, the change-over pistons and slide valve 37 move toward the left hand to their pneumatic positions.

With the change-over slide valve 37 in pneumatic position, a cavity 75 in the slide valve connects the passage 73 with a passage 76 leading to atmosphere, thus completely venting the change-over piston chamber 46. In this position of the slide valve 37, a cavity 77 therein connects the passage 51 leading from the emergency reservoir 39 to a choked atmospheric passage 78. In this position of the slide valve, a passage 79 leading from a chamber 80 at one side of the check valve piston 40 is uncovered so that fluid under pressure from the chamber 80 will flow to the valve chamber 38 causing the pressure of fluid in chamber 80 to reduce. Upon the reduction in the pressure of fluid in chamber 80, the pressure of fluid in the check valve chamber, supplied from the emergency reservoir 39, will cause the piston 40 to move upwardly carrying with it the slide valve 41. When the slide valve is thus moved it uncovers passage 79, so that fluid under pressure flows from the emergency reservoir 39 to the valve chamber 38 by way of pipe and passage 51, check valve chamber 50 and passage 79. Since the piston chamber 38 is connected to the auxiliary reservoir 9, a higher emergency pressure will be obtained than if the auxiliary reservoir 9 alone supplied fluid under pressure to the brake cylinder.

Now when the pressure of fluid in check valve chamber 50 becomes equal to or less than auxiliary reservoir pressure in piston chamber 80, the piston 40 will be moved downwardly carrying the slide valve 41 to a position where it will lap the passage 79 and prevent the back flow of fluid under pressure from the valve chamber 38.

Fluid under pressure supplied to the passage 66 also flows into chambers 65 and 64 in the switch device and when the pressures on each side of the switch piston 19 are substantially equal, the pressure of a spring 81, contained in the chamber 64, will cause piston 19 to move downwardly and thus draw the contact 20 of the switch out of contact with the contact terminals 21 and 22, which disconnects the train wire from ground 24. With the train wire thus disconnected from ground the magnet 14 will be energized and the magnet 15 will remain deenergized. With the magnet 14 energized the valve 16 will be unseated and the valve 17 seated. The valve 16 being unseated the change-over piston chamber 55 will be vented to the atmosphere by way of passage 56, passage 57, chamber 54 in one of the magnet valve devices, past the unseated valve 18 through valve chamber 58, passage 59, valve chamber 60, past the unseated valve 16 and atmospheric passage 61.

Since the slide valve 37 of the change-over valve, in its pneumatic position, closes communication from the passage 57 to the passage 66, there will be no flow of fluid under pressure from the brake cylinder 62 by way of passage 57 when the magnet 14 is again energized.

When that which caused the sudden reduction in brake pipe pressure has been eliminated, fluid under pressure will flow through the brake pipe 6 into the triple valve piston chamber 5, and when the pressure of fluid in this chamber becomes greater than auxiliary reservoir pressure in the valve chamber 8, the triple valve piston 7 and slide valves 10 and 11 will be caused to move to their release positions, as shown in the drawing, and auxiliary reservoir pressure will again be built up through the feed groove 44. With the slide valve 10 in release position, fluid under pressure is again supplied from the valve chamber 8 to the change-over piston chamber 46 by way of port 47 in the slide valve 10 and passage 48, which causes the change-over pistons and slide valve 37 to move to their right hand or electric positions. It will be understood that so long as the slide valve 10 remains in emergency position, the change-over piston chamber 46 will be vented to atmosphere, so that when the change-over piston chamber 55 is vented to atmosphere by the unseating of the valve 16, the change-over valve device will remain in its pneumatic position thus rendering an electric release of the brakes impossible and rendering it imperative that the proper repairs be made before the brakes can be released.

With the change-over slide valve 37 in electric position, communication is again established between the passages 66 and 57 so that the brake cylinder will be vented to atmosphere in the same manner as described in connection with an electric release. Further, in this position of the slide valve, the passage 51 will be uncovered and fluid under pressure will again be supplied therethrough to the emergency reservoir 39.

If, after an application of the brakes has been effected by the deenergization of the magnets 14 and 15, there is a failure in the current supply to said magnets, the brakes may be released pneumatically. To effect such a release, the brake valve device is operated to service position in which the brake pipe pressure is reduced, so that the triple valve piston 7 and slide valves 10 and 11 will be caused to move to service position, in which the change-over piston chamber 46 is vented to the atmosphere by way of passage 48, cavity 72 in the slide valve 10 and an atmospheric passage 82. Pressure of fluid in the change-over piston chamber 55 now causes the change-over pistons and slide valve 37 to move to pneumatic position in which, communication of the passage 57 and passage 66 is closed off, thus preventing the flow of fluid under pressure to the brake cylinder by way of passage 57. In this position, the valve chamber 8 is connected to the brake cylinder by way of a service port 83 in the slide valve 10 and passage and pipe 66.

The brake valve device is now moved to release position in which the pressure of fluid in the brake pipe is again restored, thus shifting the triple valve piston and slide valves to their release positions, in which fluid under pressure will be released from the brake cylinder by way of pipe and passage 66, cavity 72 in the slide valve 10 of the triple valve device, passage 73, cavity 75 in the change-over slide valve 37 and atmospheric passage 76, thus releasing the brakes.

With the slide valve 10 of the triple valve device thus moved to release position, fluid under pressure will again be supplied to the change-over piston chamber 46 but as the change-over piston chamber 55 is also supplied with fluid under pressure the change-over pistons and slide valve will remain in their pneumatic position, thus ensuring the release of the brakes pneumatically.

If it is desired to change the equipment over from electric control to pneumatic control, the magnets 14 and 15 are first deenergized by cutting off the current supply, after which the brake valve device is operated to service position, in which position a brake pipe reduction is effected which causes the triple valve device to operate to service position, controlling the operation of the change-over valve device to its pneumatic position, all of which operations are the same as described in connection with the release of the brakes after the magnets 14 and 15 are deenergized.

The brake valve device is now operated to release position, causing the pressure of fluid in the brake pipe to be restored, which causes the equipment to operate to release the brakes in the same manner as has been described in connection with the release of the brakes after the magnets 14 and 15 are deenergized.

Now with the electric portion deenergized and the brakes released, the equipment will operate pneumatically and in harmony with other cars of a train equipped with the usual fluid pressure brake apparatus.

It will be noted that when the change-over valve device is in pneumatic position, the emergency reservoir 39 is vented to the atmosphere and that the check valve 41 closes the passage 79 so that fluid under pressure from the change-over valve chamber 38 is not permitted to flow to and charge the emergency reservoir. As the emergency reservoir is thus isolated from the auxiliary reservoir the pneumatic portion will function in harmony with all of the other cars of a train.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In an electro-pneumatic brake, the combination with means for controlling the brakes electrically and means for controlling the brakes pneumatically, of a plurality of reservoirs, and a valve device having a position for rendering the electric controlling means effective to control the brakes and for establishing communication from one of said reservoirs to the other, and having another position for rendering the pneumatic controlling means effective to control the brakes and for closing said communication.

2. In an electro-pneumatic brake, the combination with means for controlling the brakes electrically and means for controlling the brakes pneumatically, of a plurality of reservoirs, and a valve device having a position for rendering the electric controlling means effective to control the brakes and for establishing communication from one of said reservoirs to the other, and having another position for rendering the pneumatic controlling means effective to control the brakes and for venting one of said reservoirs to the atmosphere.

3. In an electro-pneumatic brake, the combination with means for controlling the brakes electrically and means for controlling the brakes pneumatically, of an auxiliary reservoir charged with fluid under pressure, an emergency reservoir, and a valve device operative to render the electric controlling means effective to control the brakes and to charge said emergency reservoir with fluid under pressure from said auxiliary reservoir or to render the pneumatic controlling means effective to control the brakes and to vent said emergency reservoir to the atmosphere.

4. In an electro-pneumatic brake, the combination with means for controlling the brakes electrically and means for controlling the brakes pneumatically, of an auxiliary reservoir charged with fluid under pressure, an emergency reservoir, and a valve device having an electric position for rendering the electric controlling means effective to control the brakes and a pneumatic position for rendering the pneumatic controlling means effective to control the brakes, said valve device in electric position establishing communication from one reservoir to the other, and in pneumatic position closing such communication and venting said emergency reservoir to atmosphere.

5. In a braking apparatus, the combination with a brake cylinder, of electrically controlled valve means for normally controlling the supply and release of fluid under pressure to and from said brake cylinder, electrically controlled valve means and pneumatically controlled valve means for controlling communication through which the first mentioned valve means supplies fluid under pressure to the brake cylinder and through which fluid under pressure in the brake cylinder is released, a train wire over which current flows to operate both electrically controlled valve means, and means for effecting the energization of only one of said electrically controlled valve means when current is flowing over said train wire in one direction.

6. In an electro-pneumatic brake, the combination with electrically controlled means for normally controlling the brakes, said means comprising two electrically controlled devices, a single train wire through which current flows to operate both of said devices, and means for preventing the effective energization of one device when the other device is energized by flow of current through said wire, of pneumatically controlled means for controlling the brakes, and means controlled by the electrically controlled means and the pneumatically controlled means for rendering either the electrically controlled means or the pneumatically controlled means effective to control the brakes.

7. In an electro-pneumatic brake, the combination with electrically controlled means for normally controlling the brakes, said means comprising two electrically controlled devices, a single train wire through which current flows to operate both of said devices, and means for preventing the effective energization of one device when the other device is energized by flow of current through said wire, of pneumatically controlled means for controlling the brakes, and pneumatically controlled means operative to render either the electrically controlled means or the pneumatically controlled means effective to control the brakes.

8. In an electro-pneumatic brake, the combination with electrically controlled means for normally controlling the brakes, said means comprising two electrically controlled devices, a single train wire through which current flows to operate both of said devices, and means for preventing the effective energization of one device when the other device is energized by flow of current through said wire, of pneumatically controlled means for controlling the brakes, and a change-over valve device operative automatically to render either the electrically controlled means or the pneumatically controlled means effective to control the brakes.

9. In a braking apparatus, the combination with a train wire, of means for effecting the release of the brakes when current is flowing through said wire in one direction, for holding the brakes applied when current is flowing through said wire in the reverse direction, and for applying the brakes when no current is flowing through said wire, and pneumatically controlled means for controlling the brakes when no current is flowing through said wire.

10. In a braking apparatus, the combination with a train wire, of means for effecting the release of the brakes when current is flowing through said wire in one direction, for holding the brakes applied when current is flowing through said wire in the reverse direction, and for applying the brakes when no current is flowing through said wire, pneumatically controlled means operative to control the brakes when no current is flowing through said wire, and means automatically operative to render said pneumatically controlled means effective to control the brakes.

11. In a braking apparatus, the combination with a brake cylinder, of means for normally controlling the brakes electrically and operative upon deenergization to supply fluid under pressure to the brake cylinder and operative upon energization to release fluid under pressure from the brake cylinder, a brake pipe charged with fluid under pressure, means for pneumatically controlling the supply and release of fluid under pressure to and from the brake cylinder when the electric controlling means is rendered inoperative to control the brakes, and a switch device operative by fluid under pressure supplied by the pneumatic controlling means upon a sudden reduction in brake pipe pressure for deenergizing the electric controlling means, and means operative by fluid under pressure supplied upon the deenergization of the electric controlling means to establish communication through which fluid under pressure is released from the brake cylinder when the pressure of fluid in said brake pipe is restored.

12. In a braking apparatus, the combination with a brake cylinder, of means for normally controlling the brakes electrically and operative upon deenergization to supply fluid under pressure to the brake cylinder and operative upon energization to release fluid under pressure from the brake cylinder, a brake pipe charged with fluid under pressure, means for pneumatically controlling the supply and release of fluid under pressure to and from the brake cylinder when the electric controlling means is rendered inoperative to control the brakes, and a switch device operative by fluid under pressure supplied by the pneumatic controlling means upon a sudden reduction in brake pipe pressure for deenergizing the electric controlling means, and valve means operative by fluid under pressure supplied by the electric controlling means upon deenergization for closing communication through which fluid under pressure is normally supplied to the brake cylinder by said electric controlling means, said switch device being operative to cause the electric controlling means to be reenergized when the application of the brakes is effected.

13. In a braking apparatus, the combination with a brake cylinder, of means for normally controlling the brakes electrically and operative upon deenergization to supply fluid under pressure to the brake cylinder and operative upon energization to release fluid under pressure from the brake cylinder, a brake pipe charged with fluid under pressure, means for pneumatically controlling the supply and release of fluid under pressure to and from the brake cylinder when the electric controlling means is rendered inoperative to control the brakes, and a switch device operative by fluid under pressure supplied by the pneumatic controlling means upon a sudden reduction in brake pipe pressure for deenergizing the electric controlling means and operative upon the equalization of brake cylinder pressure and the pressure of fluid supplied by said pneumatic controlling means for reenergizing said electric controlling means, and means operative upon the deenergization of said electric controlling means for preventing the release of fluid under pressure from said brake cylinder by said electric controlling means when said electric controlling means is reenergized.

14. In a braking apparatus, the combination with a brake cylinder, of means for normally controlling the brakes electrically and operative upon deenergization to supply fluid under pressure to the brake cylinder and operative upon energization to release fluid under pressure from the brake cylinder, a brake pipe charged with fluid under pressure, means for pneumatically controlling the supply and release of fluid under pressure to and from the brake cylinder when the electric controlling means is rendered inoperative to control the brakes, and a switch device operative by fluid under pressure supplied by the pneumatic controlling means upon a sudden reduction in brake pipe pressure for deenergizing the electric controlling means and operative upon a predetermined build up of the pressure of fluid in the brake cylinder for reenergizing said electric controlling means, and means operative upon the deenergization of said electric controlling means for preventing the release of fluid under pressure from said brake cylinder by said electric controlling means when said electric controlling means is reenergized.

15. In a braking apparatus, the combination with a brake cylinder, of means for normally controlling the brakes electrically and operative upon deenergization to supply fluid under pressure to the brake cylinder and operative upon energization to release fluid under pressure from the brake cylinder, a brake pipe charged with fluid under pressure, means for pneumatically controlling the supply and release of fluid under pressure to and from the brake cylinder when the electric controlling means is rendered inoperative to control the brakes, and a switch device operative by fluid under pressure supplied by the pneumatic controlling means upon a sudden reduction in brake pipe pressure for deenergizing the electric controlling means and operative upon a predetermined build up of the pressure of fluid in the brake cylinder for reenergizing said electric controlling means, and means for preventing the release of fluid under pressure from said brake cylinder when said electric controlling means is reenergized.

16. In a braking apparatus, the combination with electric means for normally controlling the brakes, of pneumatic means for controlling the brakes when said electric controlling means is rendered inoperative, a brake pipe charged with fluid under pressure, the pneumatic means being also operative upon a sudden reduction in brake pipe pressure for effecting an application of the brakes, and means operative upon the operation of said pneumatic controlling means when there is a sudden reduction in brake pipe pressure for rendering said electric controlling means inoperative to effect a release of the brakes.

17. In a braking apparatus, the combination with a brake pipe charged with fluid under pressure, of means for controlling the brakes electrically, pneumatic means for effecting an application of the brakes upon a sudden reduction in brake pipe pressure, and means operative upon the operation of said pneumatic means for preventing the release of the brakes by the electric controlling means.

18. In a braking apparatus, the combination with a brake pipe charged with fluid under pressure, of means for controlling the brakes electrically, pneumatic means for effecting an application of the brakes upon a sudden reduction in brake pipe pressure and means operative upon the operation of said pneumatic means for establishing communication through which fluid under pressure from the brake cylinder is released when the brake pipe pressure is restored.

19. In a braking apparatus, the combination with means for electrically controlling the brakes and means for pneumatically controlling the brakes, of an auxiliary reservoir, an emergency reservoir, a valve device having a position for rendering the electric controlling means effective to control the brakes and to establish communication from one of said reservoirs to the other and having a position for rendering the pneumatic controlling means effective to control the brakes and for establishing communication through which said emergency reservoir is vented to atmosphere, means subject to the pressure of fluid supplied by said emergency reservoir for establishing communication through which said reservoirs are connected when said valve device is operated from its electric position to its pneumatic position, said means being operative upon the reduction in emergency reservoir pressure to close the last mentioned communication to prevent the charging of said emergency reservoir with fluid under pressure when the brake is being pneumatically controlled.

20. In a braking apparatus, the combination with means for electrically controlling the brakes and means for pneumatically controlling the brakes, of an auxiliary reservoir, an emergency reservoir, a valve device having a position for rendering the electric controlling means effective to control the brakes and to establish communication from one of said reservoirs to the other and having a position for rendering the pneumatic controlling means effective to control the brakes and for establishing communication through which said emergency reservoir is vented to atmosphere, a check valve device subject to the pressure of fluid supplied by said emergency reservoir for establishing communication from one reservoir to the other when said valve device is operated from electric to pneumatic position and operative upon the reduction in emergency reservoir pressure to close the last mentioned communication to prevent the charging of the emergency reservoir when the brake is being pneumatically controlled In testimony whereof I have hereunto set my hand, this 30th day of August, 1928.

THOMAS H. THOMAS.